Dec. 21, 1965  M. TESSLER ETAL  3,224,789
CASTERED TRANSPORTABLE CONTAINER
Filed Jan. 13, 1964

INVENTOR.
MORTY TESSLER
SAMUEL GASS
BY
Peter J. Baylor
ATTORNEY

United States Patent Office 3,224,789
Patented Dec. 21, 1965

3,224,789
CASTERED TRANSPORTABLE CONTAINER
Morty Tessler and Samuel Gass, 44 Brinkerhoff Ave.,
Freehold, N.J.
Filed Jan. 13, 1964, Ser. No. 337,340
4 Claims. (Cl. 280—47.26)

This invention relates to a transportable garbage container provided, in a novel manner, with a caster system. More specifically, it deals with a garbage container, such as a garbage can, having casters with a flat base, and novel caster base-engaging means on the bottom of the container, and having novel handle means for pulling said castered container with ease.

Various containers, such as garbage cans, have been described in the art as being made transportable by attachment to the bottoms thereof of wheels. Such wheels, however, have been connected to an axle and to a supporting structure on the container, which assembly makes for an expensive and cumbersome unit.

Modifications of the aforesaid wheeled containers have been described wherein the container side and portion of the bottom have been offset to enable clearing of the ground by the bottom edge of the container adjacent the wheels. This, of course, requires new expensive dies for producing such newly-shaped cans, and, furthermore, the capacity of the cans is reduced accordingly.

According to the present invention, a garbage container may be produced which does not involve excessive forming of the bottom, and does not require special caster mountings. Furthermore, it does not require the off-setting of the wall and bottom of the container, if such operation is not desired.

Figure 1:
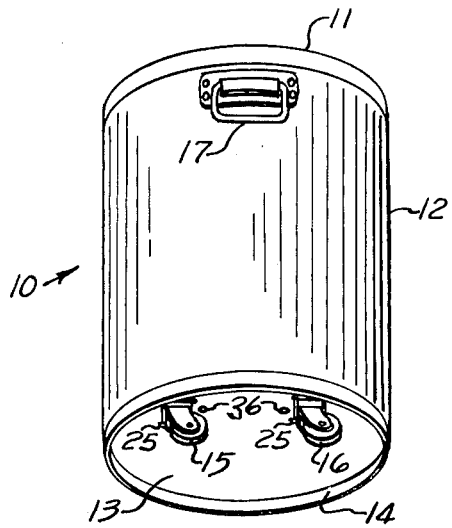
Figure 5:
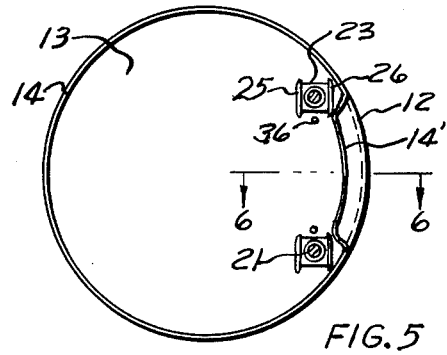
Figure 2:
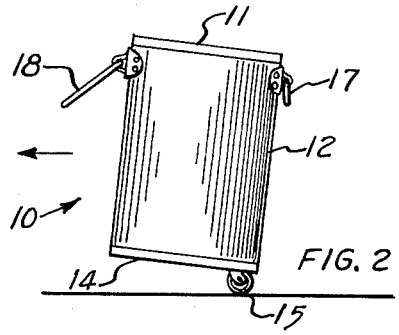
Figure 6:
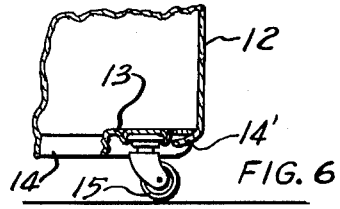
Figure 3:
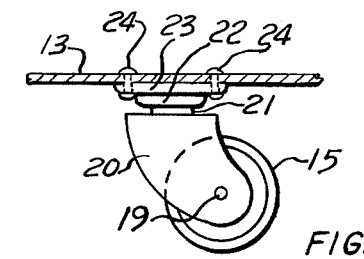
Figure 7:
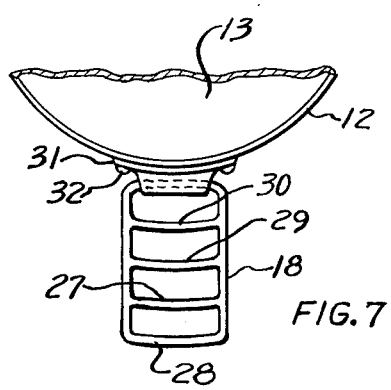
Figure 4:
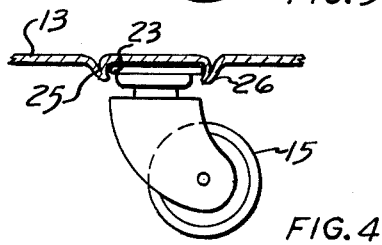

The invention will be more readily understood by reference to the accompanying drawing in which a preferred embodiment is described, and in which FIGURE 1 depicts a perspective side view (as observed from the bottom) of a container of the present invention, while FIGURE 2 shows a side elevational view thereof disposed at right angles to that shown in FIGURE 1. FIGURE 3 illustrates a cross-sectional view of a portion of the container bottom at the caster mounting of one mounting means, while FIGURE 4 presents a similar view with a preferred mounting means. FIGURE 5 depicts a bottom view of a castered container (with casters cut off at their shafts) showing the caster mounting of FIGURE 4, and the bent-under rim portion between the casters. FIGURE 6 shows a cross-sectional side view of a portion of the container along line 6—6 in FIGURE 5. A top or plan view of a portion of the container adjacent the runged handle is illustrated in FIGURE 7. Similar numerals refer to similar parts in the various figures.

Referring again to the drawing, numeral 10 refers generally to the container having top rim 11, side 12, and bottom 13, the bottom usually having a downwardly-projecting rim 14. Casters 15 and 16 are mounted on bottom 13. A short handle 17 is attached to side 12 near the upper rim 11 on the side of the caster mountings, while a longer runged handle 18 is similarly attached to side 12 opposite handle 17. Casters 15 and 16 are mounted on axles 19 in saddle mounting 20, to the top of which is attached shaft 21 which generally swivels in a ball bearing cage 22, the upper portion of which is attached to flat base 23 which serves as the mounting of the caster. In FIGURE 3, base 23 is attached to container bottom 13 by means of rivets 24, although it could be bolted, soldered, or welded to the container bottom 13. However, a preferred and novel method of mounting the casters is shown in FIGURE 4, which method is cheaper and which involves considerably less time, since the mounting means on the bottom 13 may be made at the same time when the bottom is being punched out.

It will be noted from FIGURE 4 that two projections 25 and 26 are punched downwardly out of bottom 13 and slanted toward each other so as to hold base 23 of caster 15 after it is slid therebetween. These projections are preferably linear in form, as shown in FIGURE 5, and they are preferably disposed as close as possible to bottom rim 13 so that the rim can serve as a stop against sliding out of caster base 23. A downwardly-punched dimple 26 in bottom 13 adjacent caster base 23, and between projections 25–26, serves, as the other stop for caster base 23.

It will also be noted from FIGURES 5 and 6 that transportability of container 10 is improved considerably when the bottom rim 14 is bent inwardly between casters 15 and 16. This portion 14' of rim 14 is bent in until it is almost abutting bottom 13. Since these rims usually run about ¾" in length, their elimination by bending between the casters permits additional raising of the container at the long handle-end, and it also makes less possible the dragging of the rim between the casters, as this portion of the bottom would be the lowest when the container is pulled in the direction of the arrow in FIGURE 2.

Handle 18, which is desirably attached to container wall 12 as close to top 11 as possible, is provided with at least one holding loop or rung 27, in addition to terminal holding loop or rung 28, and preferably having additional rungs 29 and 30. This long handle 18 is held in place in mounting 31 attached to container side 12 by rivets 32, as is apparent from FIGURE 7. These rungs 27, 28, 29 and 30 are selectively gripped, depending on the height of the person pulling the container. For example, a shorter person would use loop 29 or 30, while a taller person would more comfortably employ loop 28 or 27, which would eliminate the necessity of excessive stooping.

Merely for purposes of example, it can be specified that a garbage can having a 16" bottom, and employing the present invention, can have the caster mountings near the edge and about 14" apart. The bottom rim may be lapped inwardly for an arc of about 12" between the casters, the latter having wheels about 1½ to about 3" in diameter. The mounting projections may be 1½" apart at the top, between which are slid the caster bases, the latter having a width of about 1¼". Handle 18 may have a length up to 6" or even 8", with rungs about 2" apart.

We claim:
1. A transportable garbage container mounted on flat base casters and having sides and a flat bottom, comprising,
    two spaced pairs of downwardly-directed projections disposed in said container bottom. each pair being disposed adjacent the bottom container edge near the container side and slanted toward each other and designed to hold a flat caster base therebetween, and
    a handle attached near the top of said container on the side opposite said container side which is adjacent to and between said projections.
2. A transportable garbage container having sides and a flat bottom, comprising,
    two spaced pairs of downwardly-directed projections disposed in said container bottom, each pair being disposed adjacent the bottom container edge and near the container side and slanted toward each other and designed to hold a flat caster base therebetween,
    a pair of flat based casters disposed and held between said projections,
    a long handle having multiple rungs and attached at near the top container edge and to the container side opposite said container side which is adjacent to and between said casters.
3. A transportable garbage container having sides and rimmed flat bottom, comprising, two spaced pairs of downwardly-directed linear projections disposed in said container bottom, each pair being disposed adjacent the bottom container edge near the container side and slanted toward each other and designed to hold a flat caster base therebetween, a pair of flat based casters disposed and held between said projections, a long handle having multiple rungs and attached at near the top edge of the container and to the container side opposite said container side which is adjacent to and between said casters, and said container having its bottom rim lapped inwardly between said casters to form a lap which substantially abuts said bottom.

4. A transportable garbage container having sides and a rimmed flat bottom, comprising, two spaced pairs of downwardly-directed linear projections disposed in said container bottom, each pair being disposed adjacent the bottom container edge near the container side and slanted toward each other and designed to hold a flat caster base therebetween, a pair of flat based casters disposed and held between said projections, a long handle having multiple rungs and attached at near the top edge of the container and to the container side opposite said container side which is adjacent to and between said casters, and said container having a portion of its bottom rim removed between said casters thereby forming more free space for inclination of said container.

References Cited by the Examiner
UNITED STATES PATENTS

| | | | |
|---|---|---|---|
| 738,300 | 9/1903 | Detmers | 220—70 |
| 1,014,475 | 1/1912 | Holloway | 280—47.26 |
| 1,498,646 | 6/1924 | Dahl | 280—47.26 |
| 2,049,344 | 7/1936 | Wittke | 16—18 X |
| 2,366,229 | 1/1945 | Aitelli | 280—47.26 |
| 2,676,729 | 4/1954 | Neville | 280—79.2 |
| 2,790,196 | 4/1957 | Rideout et al. | 16—43 X |
| 2,953,387 | 9/1960 | Portner | 280—47.26 X |

FOREIGN PATENTS

| | | |
|---|---|---|
| 237,701 | 8/1925 | Great Britain. |

BENJAMIN HERSH, *Primary Examiner.*

A. HARRY LEVY, *Examiner.*